Dec. 19, 1922.

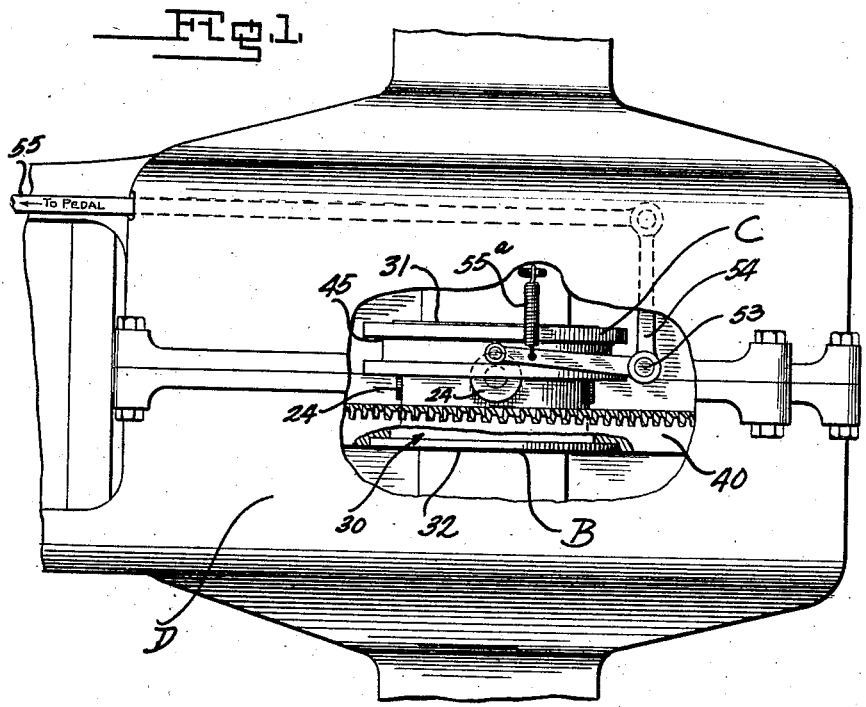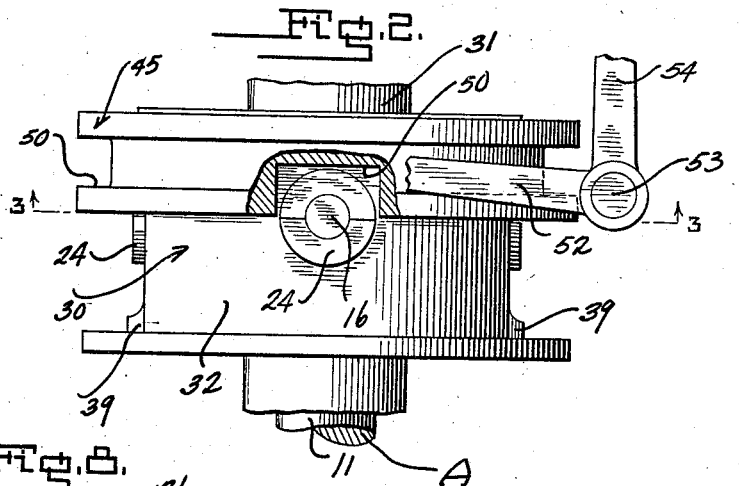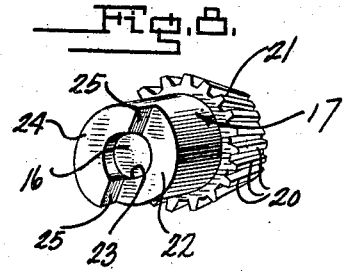

M. F. HINTZE.
DIFFERENTIAL LOCKING MECHANISM.
FILED FEB. 2, 1922.

Inventor
Mauarii F. Hintze

By Lancaster and Allwine
Attorneys

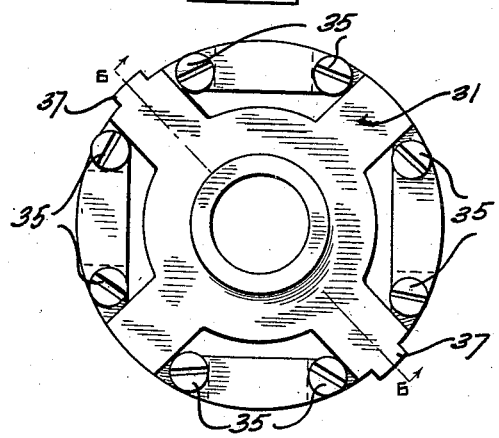
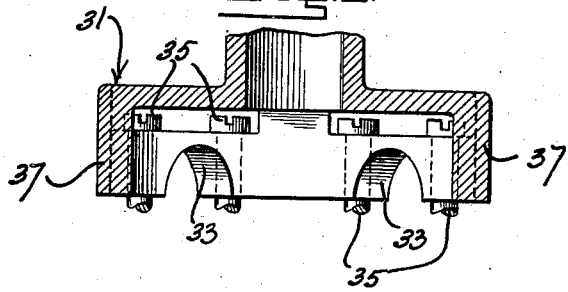
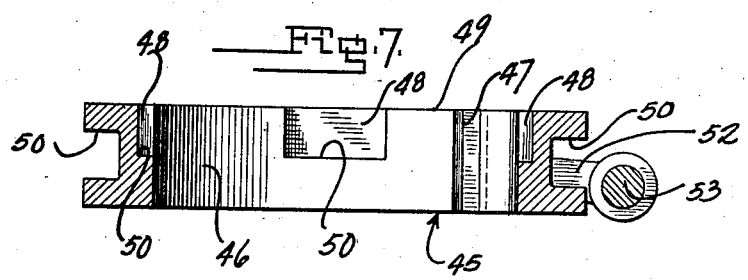

Patented Dec. 19, 1922.

1,439,239

UNITED STATES PATENT OFFICE.

MAUARII F. HINTZE, OF PAPEETE, TAHITI, SOCIETY ISLANDS.

DIFFERENTIAL LOCKING MECHANISM.

Application filed February 2, 1922. Serial No. 533,615.

*To all whom it may concern:*

Be it known that I, MAUARII F. HINTZE, a citizen of France, residing at Papeete, Tahiti, Society Islands, have invented certain new and useful Improvements in Differential Locking Mechanism, of which the following is a specification.

This invention relates to a differential gear operating mechanism.

The primary object of the invention is the provision of improved means for use in connection with the ordinary differential mechanism of automotive vehicles, and whereby a plurality of axle sections may be selectively controlled for independent or uniform operation.

A further object of the invention is the provision of novel mechanism for selectively controlling the operation of pinions in an ordinary differential mechanism, and whereby certain differential gears of said differential mechanism are selectively controlled for uniform or independent rotation.

A further object of the invention is the provision of an improved differential control mechanism of the above described character, which is relatively simple in construction, and effective in operation.

Other objects and advantages will be apparent during the course of the following detailed description.

In the accompanying drawings, in which similar reference characters designate corresponding parts throughout the several views, Figure 1 is a fragmentary plan view of a housing containing a differential mechanism and showing an improved locking means associated with said differential mechanism for selective control thereof.

Figure 2 is a fragmentary plan view, partly in section, of certain essential details of the improved differential mechanism.

Figure 5 is an end view of a part of the differential casing.

Figure 6 is a cross sectional view taken on the line 6—6 of Figure 5.

Figure 7 is a cross sectional view showing certain details of a clutch mechanism used in connection with the invention.

Figure 8 is a perspective view of a differential pinion showing the novel construction thereof as designed for cooperation with the differential locking means.

Figure 3:
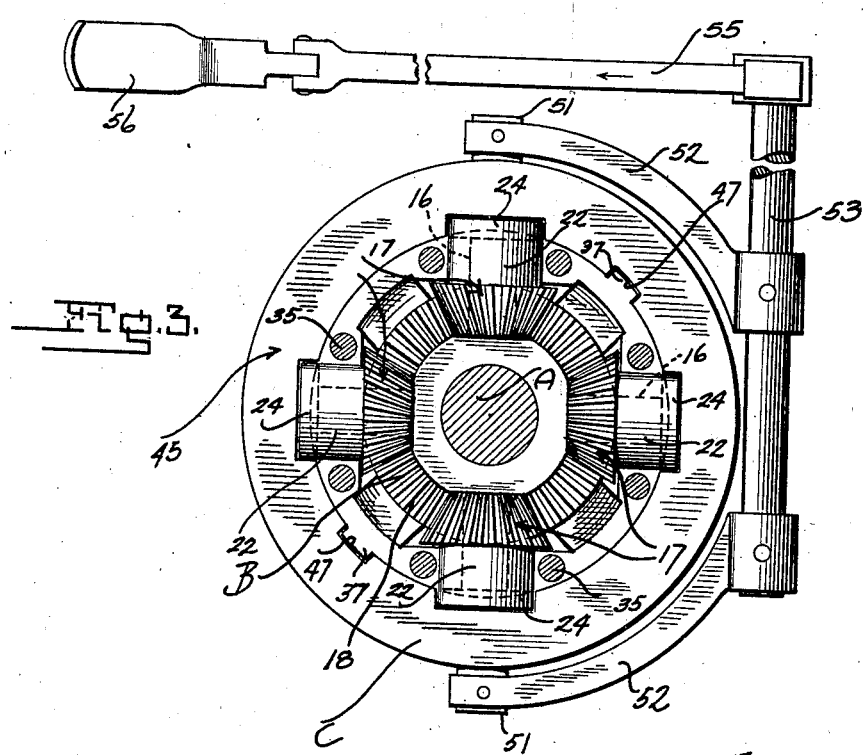
Figure 3 is a cross sectional view taken through the differential mechanism and showing the essential gearing thereof.
Figure 4:
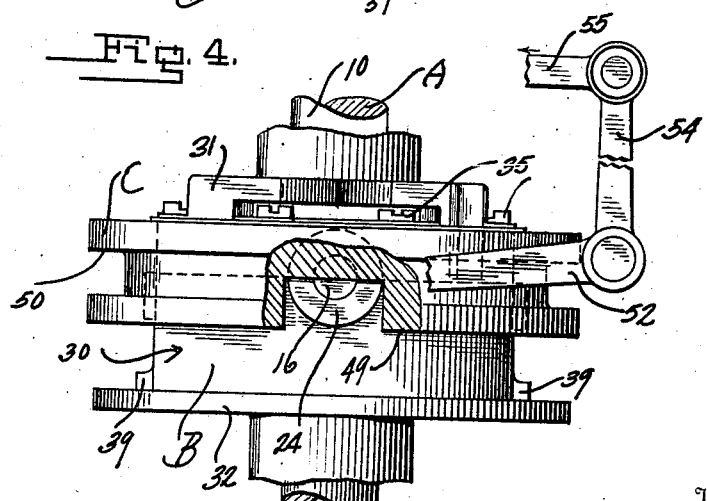
Figure 4 is a fragmentary plan view, partly in section and showing the mechanism substantially embodied in Figure 2, although in a differently adjusted position.

In the drawings, wherein for the purpose of illustration is shown a preferred embodiment of my invention, the letter A designates an axle having the differential mechanism B mounted thereon. The improved differential locking means C is adapted for use in connection with the differential mechanism B, both said differential B and locking means C being contained in a housing D.

The vehicle axle A is of the ordinary traction type, and includes the aligning sections 10 and 11 upon the abutting ends whereof is disposed the differential mechanism B.

The differential mechanism B may be of any approved type, and in the present instance includes a spider member 15 having a plurality of arms 16 radiating therefrom, and upon which are supported differential pinions 17 of novel formation. The abutting ends of the axle sections 10 and 11 are provided with the ordinary differential gears 18, which are adapted for meshing relation with the bevelled teeth 20 of the pinion gears 17 in the ordinary manner.

Each of the differential pinions 17 include a head 21 upon which the bevelled teeth 20 are formed, and a rearwardly extending sleeve 22. An aperture 23 is provided axially through the pinion 17, and which is opened entirely through the pinion 17 for the reception of an arm 16 of the spider 15 and whereby the pinion 17 is rotatably mounted upon said arm 16. The outer collar or sleeve 22 is provided with a portion 24, which projects for substantially one half of a circumference outwardly therefrom and forms a half ring shaped projection, which provides the vertical abrupt faces 25, the outer surface of this projection 24 being arcuated and lying flush with the outer surface of the sleeve or collar 22.

A casing 30 is provided for housing the differential gearing, and includes the portions 31 and 32 adapted for respective mounting upon the axle sections 10 and 11. The abutting circumferential marginal edges of the sections 31 and 32 are each provided with arcuate depressions 33 and adapted for receiving the sleeve portions 22 of the pinion gears 17 and in a manner which can readily be seen from the drawings. Bolts 35 are provided for transverse engagement through the casing sections 31 and 32 and of course adapted for holding the differential pinions 17 in relative operating position with the axle differential gearing 18. The outer circumferential surfaces of the sections 31 and 32 lie flush with each other, and at the juncture point of these casing sections 31 and 32, the projecting portions 24 of the pinions extend outwardly from the outer circumference of the casing 30. The section 31 is provided with certain keys 37 upon the outer circumference thereof and which are adapted for receiving portions of the locking mechanism C to be subsequently described. The outer circumference of the casing section 32 is provided with certain keys 39 adapted for supporting the ordinary ring gear 40 found as a part of the differential upon automotive vehicles.

The locking mechanism C includes a ring shaped clutch member 45 upon the interior circumference 46 of which the transverse keyways 47 are provided for receiving the keys 37 upon the casing section 31 and which structure is provided in order that the clutch member 45 may move or slide longitudinally of the casing 30 and is prevented from relative rotation therewith.

The interior circumference 46 of the member 40 is provided with inward polygonal shaped pockets 48 opening from the marginal edge 49 of the clutch member 45, said marginal edge 49 being the edge which directly faces the pinion 17. It should be noted that the pockets 48 only extend about one half of the width of the member 45 and provide an interior abrupt vertical face 50. The outer circumference of the member 45 is provided with an annular groove 50, in which the fingers 51 of the clutch yoke arms 52 extend. The yoke arms 52 are rigidly mounted for movement with a pivot pin 53, said pivot pin having an extension arm 54 rigid therewith and which forms with the yoke arm 52 and pin 53, a bell crank arrangement. The outer end of the extension arm 54 has an operating rod 55 pivoted thereto; the remote end of said operating rod 55 has a pedal 56 or other arrangement connected thereto, and which may be conveniently located in the driver's compartment of the automotive vehicle to which the improved differential lock means is attached.

In the mounting of the clutch member 45 upon the casing 30, the keys 37 and keyways 47 so position the same thereon as to have a pocket depression 50 immediately facing each projection 24 of a pinion 17. During the normal operation of the differential mechanism B as found upon most types of automotive vehicles, the clutch member 45 will be positioned substantially as illustrated in Figure 2 and whereby the pinions 17 may rotate relative to each other upon their axes as defined by the spider arms 16, and thus permitting ordinary operation of the differential mechanism. During this positioning of the member 45, the respective depression 48 of a pinion 17 will be so positioned as to in no way interfere with rotation of said pinion upon its axis and by reason of its projection 24. In this neutral position of the clutch member 45, it is preferred that a tension spring 55a be provided for engagement with the upper yoke arm 52, and at its other end engage through the interior of the housing D; an initial tension in the spring 55a being provided for maintaining the clutch member 45 out of locking engagement with the differential mechanism B.

It is a well known fact that the lack of some means to make the traction wheels of a motor vehicle rotate uniformly at certain times, is a disadvantage. This is particularly true when one traction wheel of an automotive vehicle is ditched and the other traction wheel is upon solid ground. During ordinary operation of the differential mechanism, the wheel on solid ground would remain stationary under action of the differential mechanism, and the ditched wheel would merely rotate in sliding manner over the ground surface in which the same is ditched. However, could the pinions 17 be locked against relative rotation, the axle sections 10 and 11 will move uniformly and thus control uniform movement of the traction wheels thereon. When it is desired to so lock the differential mechanism as to make traction wheels move uniformly, the operator of the vehicle by depressing the pedal 56 so operates the control rod 55 as to rock the yoke mechanism mounted upon the pivot pin 53, and thus slide the clutch member 45 upon the differential casing 30. The member 45 by sliding relative over the casing 30 in the direction of the pinions 17, so places the vertical face 50 of each pocket 48 as to be positioned for engagement with the abrupt vertical faces 25 of the pinions 17 which are in the differential mechanism. It can readily be seen that when the abrupt faces 25 of each pinion 17 contacts the shoulder or abrupt surface 50 of each pocket 48, axial rotation of the pinions 17 will be stopped. It is at once obvious that by stopping relative axial rotation of the pinions 17, the axle sections gears are locked for uniform rotation, and thus compelling a uniform rotation of the axle sections 10 and 11 to secure the desired uniform movement of the traction wheels disposed thereon.

From the foregoing, it can be seen that a differential locking mechanism has been provided which is simple in construction and which will effect an equalizing of the power upon the traction wheels under certain conditions.

Various changes in the shape, size and arrangement of parts may be made to the form of the invention herein shown and described, without departing from the spirit of the invention or the scope of the claims.

I claim.

1. In a differential locking mechanism, the combination with a differential mechanism including a casing having a spider mounted therein upon which pinions are rotatably mounted and for engagement with a plurality of axle section gears, of means rigid with said pinions to project exteriorly of the outer circumference of said casing, and a clutch member longitudinally slidable over the outer circumference of said casing and locked thereto to prevent relative rotation therewith, said clutch including depressions for selective reception of said rigid projecting portion of the pinions to selectively lock said pinions against relative rotation.

2. In a differential locking mechanism, the combination with a differential mechanism including a casing, spider, axle sections, gears and pinions, said pinions each including a shank having a segmental portion projecting radially from the outer surface of said casing, and clutch means for selective engagement with the segmental projections of said pinions to selectively control axial rotation of the pinions.

3. In a device of the class described, the combination with an ordinary differential mechanism including pinions, of a shank rigid on each of said pinions and having a portion projecting outwardly thereon to provide an abrupt shoulder, a clutch sleeve slidably mounted on said differential mechanism and including a plurality of recesses for reception of the projection shank portions of said pinions, each of said recesses having an internal abrupt shoulder, said clutch sleeve adapted for control to have the abrupt shoulders thereon selectively engage the abrupt shoulders of said pinions to control axial rotation of said pinions.

4. In a differential mechanism, the combination of a plurality of axle sections, differential gears on the abutting ends of said axle sections, a spider, pinions rotatably mounted upon said spider and including shanks having segmental projecting portions upon the ends of said shanks, a differential casing for rotatably engaging the shanks of said pinions to maintain said pinions in intermeshing relation with said axle differential gears and whereby the segmental projecting portions of said pinions extend exteriorly of the outer circumference of said differential casing, keys mounted upon the exterior surface of said differential casing, a clutch member longitudinally slidable over said differential casing and held against relative rotation therewith by said keys, said clutch member having a plurality of polygonal shaped pockets depressed upon an interior circumference thereof to provide an abrupt shoulder in each pocket, an operating yoke for said clutch member, and means pivotally connected to said yoke for operating the same whereby said clutch member may be moved so that the abrupt shoulders in the pockets thereof engage the segmental projecting portions of the differential pinions to lock the same against axial rotation.

5. A differential locking mechanism comprising a plurality of axle sections having differential gears on the proximate ends thereof, a spider, bevel pinions rotatably mounted upon said spider and including shanks having segmental projecting portions upon the ends thereof, a casing rotatably receiving the shanks of said pinions in radial manner to have the segmental projections of said pinions extending outwardly from the outside circumferential surface of the casing, and clutch means embodying a sleeve member slidable over the outer circumference of said casing having a plurality of abrupt surfaces thereon adapted for selective engagement with certain abrupt surfaces provided by the segmental projections of said pinion whereby the pinions may be prevented from rotating with respect to said casing in order that said axle sections will move at the same rate of speed.

6. In a differential locking mechanism, the combination with a plurality of axle sections, of differential gears mounted on the proximately disposed ends of said axle sections, a supporting casing embodying a pair of sections detachably assembled over the proximate ends of said sections and said differential gears, said casing sections when assembled providing radial openings therein, a spider having radial shanks extending therefrom into the openings of said casing, pinions of bevelled formation having sleeves axially extending therefrom and rotatably bearing in the openings of said casing, said pinions having axial openings therethrough and rotatably receiving the shanks of said spider, each of said pinion shanks including a segmental portion upon the outer end thereof adapted for extension in radial manner from the outer surface of said casing, and a clutch sleeve slidable longitudinally upon the outer surface of said casing embodying a plurality of pockets having vertically disposed abrupt shoulders inwardly thereof for cooperation against the abrupt surfaces of said segmental projections, and whereby the pinions my be maintained in a fixed relation against rotation with respect to said casing for locking said axle sections together for movement.

7. As an article of manufacture, a differential pinion embodying a bevelled gear portion having a shank extending outwardly therefrom and provided with a passageway extending axially therethrough, said shank having a concavo-convex portion extending outwardly on the end thereof opposite to said gear portion providing abrupt shoulders thereon on opposite sides of the passageway provided therethrough.

In testimony whereof I affix my signature.

MAUARII F. HINTZE.